May 2, 1939.  H. HEMPEL  2,156,985
METHOD OF TREATING FISH LIVERS
Filed March 11, 1937
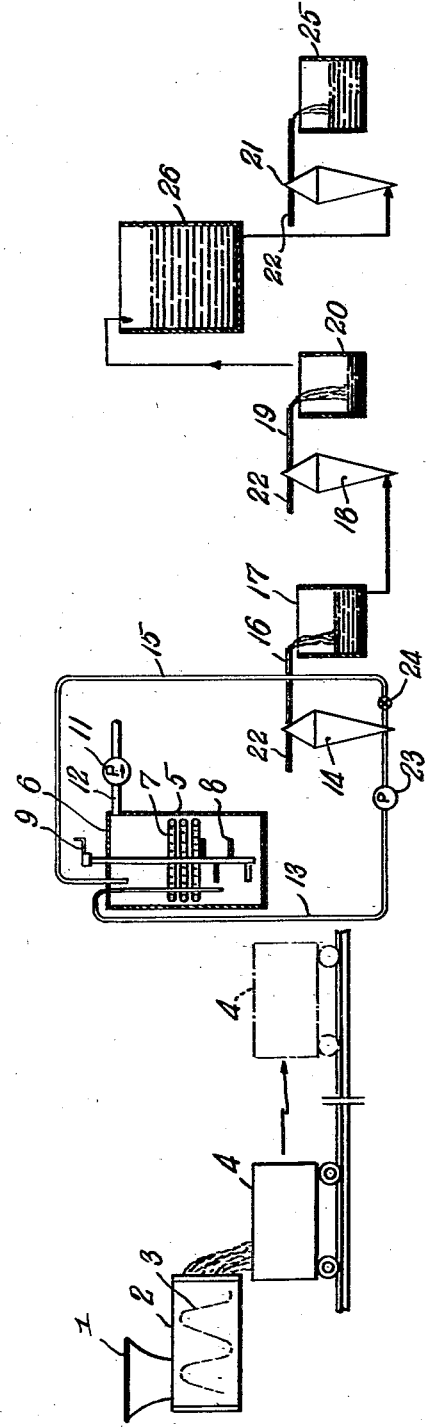
Inventor:
Herbert Hempel
by Roberts, Cushman & Woodberry
his Attys.

Patented May 2, 1939

2,156,985

UNITED STATES PATENT OFFICE 2,156,985

METHOD OF TREATING FISH LIVERS

Herbert Hempel, Essex, Mass., assignor to Gorton-Pew Fisheries Company, Ltd., Gloucester, Mass., a corporation of Massachusetts Application March 11, 1937, Serial No. 130,321

15 Claims. (Cl. 87—6)

This invention relates to a process of separating the oil content of fish livers from the liver tissue and other materials normally associated therewith, especially in a condition suitable for medical use and without deterioration of its vitamin content or loss of other desirable properties.

Animal oils occur associated with tissue and generally are contained in porous tissue or cells. The recovery of the oil involves a separation of the oil from the tissues and cell walls.

There are three types of procedure for accomplishing this separation—pressing, extracting and digestion. In pressing processes, the material is comminuted more or less and subjected to heavy pressure which squeezes out the oil. This procedure, which is the commonest practice for recovering both animal and vegetable oils, is simple; the yield, however, is not as great as by other processes.

In extraction processes, a solvent is used which dissolves out the oil leaving the tissue. The resulting solution of oil is then removed, usually by pressure filtration, and the solvent distilled off from the oil. The solvent is recovered and the oil is ready for sale or further refining. In this type of process, the yields are higher than obtained by pressing, but the process is complicated by the steps of treating with solvents and the recovery of these solvents with sufficiently high efficiency to avoid costly losses. Traces of the solvent remaining in the finished oil produced may materially reduce its value for medicinal purposes. Procedures for removing such traces of the solvent not only involve the expense of further operations but may also have a deteriorating effect upon the oil.

In digestion processes, the tissue or cell structure containing the oil is degenerated or destroyed, thus liberating the oil. Two processes of this type are now commonly used—the enzymatic and thermal processes. When the former process is employed, the livers are allowed to putrefy and the liver tissue and cell walls disintegrate thus liberating the contained oil. A drawback of this procedure is that hydrolysis and rancidification of the oil takes place during the putrefaction and bacterial or other contamination may occur. In the thermal process, the livers are steamed at high temperatures (i. e., above the boiling point of water) to decompose or break down the tissue and liberate the oil, which is then removed by filtration or like operations. But the oil and particularly the vitamins which the oil contains are appreciably injured and deteriorated by heat, especially at temperatures sufficient to break down the tissue and cell walls of the livers, so that an inferior quality of oil and a reduced vitamin content is obtained in the finished product.

The process of the present invention effects the dissolution of the tissue and cell wall structure of the fish livers, without the use of enzymes or organisms, as in putrefaction processes, and hence avoids the drawbacks which are incident to such practices as already described. It also avoids the necessity of applying heat at a temperature sufficiently high or for a time sufficiently long to injure the oil or deteriorate the vitamin content. It also eliminates the utilization of putrefactive action and the introduction of bacteria which are obviously undesirable. The medicinal qualities of the resultant oil are in consequence greatly improved.

Moreover, by effecting the substantially complete dissolution of the liver tissue and cell wall substance, the oil is completely liberated and is not associated with a large mass of the solid matter of the livers, which is a condition general to many of the practices of the prior art and which involves numerous difficulties of treatment such as the necessity of drastic action to facilitate separation, numerous operations, expensive equipment, contamination of the oil and more or less reduction in the yield obtained, since a large proportion of the oil necessarily remains occluded in the voluminous residue of the cell substance and liver tissue which goes to waste.

The process of this invention is applicable to fish livers generally, including the livers of cod, halibut, swordfish, tuna, shark, whiting, etc. But it is to be understood that the livers from different species of fish are not the same from the standpoint of the oil content or of the ease of recovery of the oil therefrom. Prior practices of the art, for example, have encountered practical difficulties, especially when applied to the recovery of oil from the livers of swordfish, although the oil content of swordfish livers is especially high in vitamin potency.

Moreover, not only does the oil content of livers from the several species of fish vary, but the amount of oil contained in the liver of any particular fish will vary through the seasons of the year and with the age and condition of the fish. The livers, after removal from the fish, also undergo change and in general gradually oxidize and hydrolyze, forming an increase in the amount of free fatty acids present.

In carrying out the invention, the fish livers are preferably treated fresh—or are frozen and thereafter thawed out and subjected to the treatment—though livers which have aged may be treated if desired. The livers are generally comminuted in any suitable way until a more or less smooth, fluid consistency is obtained. While such comminution is desirable, to facilitate the dissolution of the cell walls and tissue, it is not absolutely essential, for such dissolution may be effected, even by the treatment of relatively large pieces of the liver, or the whole livers themselves, may be treated directly according to the present invention, without comminution or slicing.

The livers are, of course, preferably free from extraneous materials such as surrounding tissue, flesh, dirt, or like impurities, before comminuting. As received from the ships, the livers are sometimes frozen, and in such condition they may be comminuted by impact, or they may be thawed out and put through an ordinary mill, of the meat cutter type or the like.

Fish livers contain so high a proportion of water that upon cutting or reducing them to smaller fragments this water is in part released and the resulting mass becomes increasingly fluid as the degree of comminution is increased. While it is convenient to have the mass freely fluid for the purposes of handling, etc., it is not necessary to the satisfactory conduct of the present process, and relatively large pieces, e. g., strips or thin slices of liver, or whole livers, may be satisfactorily treated as above indicated.

The liver is then charged into a suitable vessel, in which it is treated with a soluble alkaline reagent which, in water solution, is capable of developing a pH value of 8.5 or above and which is also capable of impressing and maintaining such a pH value at or above 8.5 (but preferably not above 12.5) upon the charge of fish livers to be treated. The treated charge is then heated to an elevated temperature but not to the boiling point of water and preferably not by contact with over-heated surfaces, which may cause local decomposition.

Suitable reagents for carrying out this step of the treatment include more particularly the weaker soluble alkalies such as ammonium hydroxide, and salts of the alkali metals which ionize in solution to develop a pH value of approximately 8.5 to 12.5 which is found to be a criterion for the effective dissolution of the tissue and cellular substance of the livers. Thus, tri-sodium and tri-potassium phosphates are found to be suitable for this purpose. Borax or sodium tetra borate is also satisfactory. And such alkaline reacting salts may also be used in conjunction with small amounts of free alkali, to give a solution which is properly buffered and within the desired pH range. Such solutions can not be obtained with free caustic alkalies alone. Two things must be considered in preparing the reagent solutions. The pH must be right at the start and the quantity of alkali reagent or reagents must be sufficient to maintain the pH during digestion.

But free caustic alkalies alone, such as caustic soda or caustic potash, are not practicable, because while extremely small amounts, in solution, might give a pH value of between 8.5 and 12.5 these minute amounts would be inadequate to treat any appreciable amount of the charge of livers effectively, while very slight further additions of the reagent would carry the pH value of the resulting solution above 12.5 which is essentially the upper limit. Solutions having a pH value above 12.5 may not be used, because such a pH concentration or alkalinity is effective to hydrolyze or saponify the liver oil into the soaps of the corresponding free fatty acids and glycerine, thus causing a correspondingly increasing loss in yield of the product which is sought to be recovered, as the pH is raised above 12.5. The alkaline salts suggested as reagents fall into the category of buffer salts, that is, they tend to maintain, in solution, a substantially constant pH value even on the addition of acids or alkalies, or on changes in concentration. Ammonia acts in a similar manner to maintain a fairly constant pH value, within the limits here preferred—of 8.5 to 12.5—and hence is effective as a buffer. This is not true of the strong, caustic alkalies alone.

In the dissolution of the liver substance, in accordance with the present invention or discovery, it is believed that the protein matter of which the tissue is substantially composed, is hydrolyzed into soluble forms, either with or without the formation of soluble compounds with the reagent used.

When acids or acid radicals are present, they appear to exert a slight colligative action upon the liver substances, thus retarding the effective penetration of the reagent and the progress of the dissolution action of the reagent thereon. Moreover, soluble projects of the tissue substance or soluble compounds already formed by the alkaline action of the reagent are less soluble in the presence of such acid radicals in the water solution. In short, they tend to "salt out". Accordingly, a somewhat higher pH value is required when alkaline salts are employed than when a free alkali (such as ammonium hydroxide) is used alone in the solution in order to effect the prompt and complete dissolution of the liver substance.

The upper and lower limits of pH to be recommended in given cases will also vary somewhat with the type of liver under treatment and the age or condition of the specific material. Some types of fish livers—e. g., swordfish or halibut—are more difficult to treat than others such as cod. Again, with the older livers, more free fatty acids are present and also more products of disintegration. However, in general, a pH during the treatment of between 10 and 11.5 is always satisfactory and effective under all of the variations in the conditions and circumstances usually involved in carrying out this invention.

For example, with older and hence more readily dissolved livers, (e. g., cod livers) a pH as low as 8.5 with ammonium hydroxide solution is satisfactory. On the other hand, a pH of over 12.5 causes too much oil to be lost by saponification. Thus, if a solution of pH 14 is used (as with borax and sodium hydroxide as above mentioned, but of sufficient concentration) and the livers are heated with this solution and passed through the process, it is found that a loss of over 50% of the oil is involved, due to saponification, when treating fresh halibut livers therewith. (Under similar conditions but with a pH of 12.5, there was a loss of only about 13%, while at a pH of 11.5 the loss was less than 3% and there was no loss at a pH of 11.)

With such buffer salts alone or with solutions of free alkali which dissociate in solution to develop and maintain the desired range of pH values, or both, the free fatty acids which may be present in the livers are neutralized and rendered soluble in water, as well as the tissue and cellular substance. Heating promotes such dissolution and carries it to completion. But the elevated temperatures which are thus effective are not such as to injure the vitamins and other sensitive components or qualities of the oil.

Compounds which may hydrolyze and act as buffer reagents, but which also tend to liberate insoluble gelatinous by-products, such as sodium silicate, are not suitable for the present process.

Following such treatment of the livers and dissolution of the tissue and cellular matter, the resulting mixture of water, containing the reagent and reaction products in substantially complete solution, and the liberated liver oil, may be directly separated, like any oil and water mixture. Any extraneous solids, which may be present and have resisted dissolution, remain in the water phase in a finely divided suspension, and are separated therewith. The oil fraction is consequently obtained directly and free from contamination by solids, reagent materials or bacteria. It may contain a small amount of water, which is readily removed by desiccation. The product so obtained, therefore, constitutes a pure, uncontaminated and undeteriorated fish liver oil. Moreover, it is obtained in high yields relative to the total oil present in the livers treated.

It is a feature of the present process that the principal action, whether chemical or physical, is effected upon the solid components of the fish livers, such as the tissue and cellular matter, and that these are effectively dissolved with reagent materials and under conditions of treatment which are inert toward the oil components, so that the latter are left unchanged and undeteriorated in any respect. It is also a feature that, after such treatment, the water and oil mixture is substantially free from solid matter. Moreover, such solid matter as is present is so finely divided, that the mixture can be passed directly through a high speed centrifuge and the oil substantially completely removed therefrom in a single and simple step of procedure.

A particular instance of the practical application of the invention will be described with reference to the treatment of halibut livers for the recovery of the oil on a commercial scale.

A more or less diagrammatic illustration of the apparatus is contained in the accompanying drawing, in which:

Fig. 1 is a side elevation of the several pieces of apparatus used, arranged in the sequence of operations to be performed therewith.

Referring to the drawing, the fish livers, as received, are delivered to the hopper 1 and thence into the cutter or grinder 2, where they are sliced or chopped or may be ground by the blades 3, depending on the sharp or dull character of the blades employed. The livers are usually all of one type such as cod livers, halibut livers, etc. But this is not essential, if a mixture of the various oils in the finished product is desirable.

The livers, to be subjected to the process, are preferably free from extraneous materials such as other tissue or other organs of the fish. Fresh livers are more resistant to dissolution—both physical and chemical—than those which have been allowed to oxidize and disintegrate. But it is a feature of this invention that fresh livers may be effectively treated, and that a high recovery of oil may be obtained by the present procedure. And since putrefaction and disintegration by age and oxidation in the livers is generally undesirable, for obvious reasons as well as those above pointed out, it is recommended that fresh, clean livers or frozen livers be employed as a raw material in the present process.

The comminuted livers—sliced, ground, etc., as the case may be—are delivered from the mill to the truck 4 and wheeled across to the treating tank 5 into which a weighed amount is charged through the cover or lid 6. (If whole livers are to be treated, they will, of course, be charged directly into the treating tank 5 and the grinding device 2 and comminuting or grinding operation omitted.) For example, 500 lbs. of livers may be treated at a time, and to this quantity approximately 166 lbs. of concentrated ammonium hydroxide solution of 26° to 28° Bé. specific gravity will be added. By thus adding the concentrated ammonia solution direct to the livers it penetrates them quickly and is effective to initiate its chemical reaction upon the liver tissues etc.—to convert them into soluble derivatives and byproducts. To promote this shock effect—which is without any danger of causing other undesirable effects, such as saponification of the oil, for the reasons given above, the mixture may be allowed to stand for a short while.

The charge is then diluted with water and preferably heated, as by passing live steam into the charge by means of open steam jets in the pipe or coil 7, within the tank. The water and condensed steam may amount to about twice the volume of the original charge of livers. The charge is frequently agitated by rotating the paddle stirrer 8 by means of the handle 9. The cover 6 is closed to prevent the unnecessary escape of ammonia. But after dilution there is only a slight tendency for ammonia to evaporate from the charge. As a precaution, however, a fan 11 may be provided to draw off the vapors standing above the charge through the vent pipe 12 and discharge them out of doors.

The charge will preferably be heated to 170 to 175° F. (but not to boiling), to facilitate dissolution of the solid matter of the charge, and a sufficient amount of water is present to keep such dissolved matter in solution, even after cooling. Otherwise there may be a tendency for it to thicken or gelatinize later on in the process.

On the other hand, it is found that if too much water is used, there is a tendency for the charge to foam during subsequent centrifuging. To offset this tendency, 1½% of common salt, sodium chloride or potassium chloride (on the weight of the charge) or other suitable salt is added, which dissolves in the water phase and "kills" the foam. A large amount of salt, however, is not to be recommended since it would reduce the dissolution of the tissue material, and also of byproducts such as the ammonium soaps.

About fifteen or twenty minutes treatment is usually sufficient to effect complete dissolution of the liver tissue and cellular matter, under the conditions above described. The free fatty acids are promptly converted to ammonium soaps which dissolve readily in the aqueous phase and the protein, tissue and other solid matter is dissolved, either directly or by conversion to other soluble forms, leaving the oil globules, which were originally held in the cellular structure and tissues of the liver, free to agglomerate and separate as a free oil fraction, which is insoluble in the water and hence easily separable therefrom. The small amount of any comminuted residual solids which may be left is preferentially wetted by the water fraction and remains finely dispersed and suspended therein.

The resulting charge, which consists essentially of a water and oil mixture, is now withdrawn through pipe 13 to a centrifuge 14. Owing to the effective dissolution of the liver substance by the ammonia treatment, the amount of solid matter is so small and so finely divided that this centrifuge may be of the high speed type. Consequently, an immediate and substantially complete separation of the oil may be accomplished, with continuous operation of the centrifuge corresponding to substantially five hundred pounds of livers or more, without cleaning the centrifuge bowl of solids accumulated.

The excess of mixture delivered to the centrifuge through the pipe 13 by means of pump 23 and which the centrifuge may not be able to handle overflows through a relief valve 24 and is returned through pipe 15 to the treating tank 5. The separated water containing the dissolved liver tissue is discharged through pipe 22, and may be thrown away or treated for any residual oil which it may contain. The separated oil fraction is delivered from the centrifuge through the spout 16 into a suitable receptacle, such as a clean kettle 17 of stainless steel or Alleghany metal.

Owing to the agitation of treatment and of the centrifuging operation, the oil may still contain a little water emulsified therein. And this water or the oil itself may contain a small amount of ammonia. It is therefore effective to wash the oil further with water and again with water and a small amount of mild acid (preferably an edible fruit acid) such as citric acid. A small amount of salt is also added to the wash waters to prevent foaming. The wash water is preferably used in excess, and the mixture is again centrifuged in the high speed centrifuge 18.

The separated and purified oil as thus obtained may still contain a little water. The amount is relatively small, but it is desirable to have the oil water-free. To this end, the oil, as received from the spout 19, is charged into tank 20 and treated with a desiccant such as anhydrous sodium sulphate and agitated so as to effect intimate contact in the tank 26. It is then allowed to settle, when the desiccated oil may be decanted from the solid crystals of the desiccant, which is not soluble therein. The oil is then passed through the small, high speed centrifuge 21, from which it comes off as a highly purified fish liver oil and collected in receiver 25, suitable for medicinal use, without further treatment, and of high vitamin content and potency, and especially free from other substances, whether of the liver substance or of the reagent materials used.

I claim:

1. Method of treating fish livers, for the separation and recovery of oil therefrom, comprising the steps of subjecting the same to the action of an aqueous alkaline buffer solution, characterized by impressing and maintaining thereon a pH value from 8.5 to 12.5, to effect dissolution of the solid substance of the livers, substantially without saponifying the oil content, and thereafter separating the liberated oil from the aqueous fraction.

2. Method of treating fish livers, for the separation and recovery of oil therefrom, comprising the steps of subjecting the same to the action of an aqueous alkaline buffer solution, characterized by impressing and maintaining thereon a pH value from 8.5 to 12.5, to effect dissolution of the solid substance of the livers, substantially without saponifying the oil content, and thereafter separating the liberated oil from the aqueous fraction directly, by means of high speed centrifuging.

3. Method of treating fish livers, for the separation and recovery of oil therefrom, comprising the steps of subjecting the same to the action of an aqueous alkaline buffer solution, characterized by impressing and maintaining thereon a pH value from 8.5 to 12.5, to effect dissolution of the solid substance of the livers, substantially without saponifying the oil content, and thereafter separating the liberated oil from the aqueous fraction and washing with water and neutralizing residual traces of alkali with an edible acid.

4. Method of treating fish livers, for the separation and recovery of oil therefrom, comprising the steps of subjecting the same to the action of an aqueous alkaline buffer solution, characterized by impressing and maintaining thereon a pH value from 8.5 to 12.5, to effect dissolution of the solid substance of the livers, substantially without saponifying the oil content, and thereafter separating the liberated oil from the aqueous fraction and desiccating the same.

5. Method of treating fish livers, for the separation and recovery of oil therefrom, comprising the steps of subjecting the same to the action of an ammonium hydroxide solution, characterized by impressing and maintaining thereon a pH value from 8.5 to 12.5, to effect dissolution of the solid substance of the livers, substantially without saponifying the oil content, and thereafter separating the liberated oil from the aqueous fraction.

6. Method of treating fish livers, for the separation and recovery of oil therefrom, comprising the steps of subjecting the same to the action of a buffer salt solution, characterized by impressing and maintaining thereon a pH value from 8.5 to 12.5, to effect dissolution of the solid substance of the livers, substantially without saponifying the oil conent, and thereafter separating the liberated oil from the aqueous fraction.

7. Method of treating fish livers, for the separation and recovery of oil therefrom, comprising the steps of subjecting the same to the action of a buffer salt and alkaline hydroxide solution, having a pH value from 8.5 to 12.5, to effect dissolution of the solid substance of the livers, and thereafter separating the liberated oil from the aqueous fraction.

8. Method of treating fish livers, for the separation and recovery of oil therefrom, comprising the steps of subjecting the same to the action of an aqueous buffer solution, of an alkalinity sufficient to impress and maintain thereon a pH value of 8.5 to 12.5 and to effect dissolution of the solid matter of the livers without saponifying the oil, and heating to a temperature below the boiling point of water, followed by separating the liberated oil.

9. Method of treating fish livers, for the separation and recovery of oil therefrom, comprising the steps of comminuting the same, subjecting the comminuted material to the action of an aqueous buffer solution, of an alkalinity sufficient to impress and maintain thereon a pH value of 8.5 to 12.5 and to effect dissolution of the solid matter of the livers without saponifying the oil, and heating to a temperature below the boiling point of water, followed by separating the liberated oil.

10. Method of treating fish livers, for the separation and recovery of oil therefrom, comprising the steps of subjecting the same to the action of an aqueous buffer solution, of an alkalinity sufficient to impress and maintain thereon a pH value of 8.5 to 12.5 and to effect dissolution of the solid matter of the livers without saponifying the oil, and heating to a temperature below the boiling point of water, followed by separating the liberated oil directly, by means of high speed centrifuging.

11. Method of treating fish livers, for the separation and recovery of oil therefrom, comprising the steps of subjecting the same to the action of an aqueous buffer solution, of an alkalinity sufficient to impress and maintain thereon a pH value of 8.5 to 12.5 and to effect dissolution of the solid matter of the livers without saponifying the oil, and heating to a temperature below the boiling point of water, followed by separating the liberated oil and washing with water and neutralizing residual traces of alkali with an edible acid.

12. Method of treating fish livers, for the separation and recovery of oil therefrom, comprising the steps of subjecting the same to the action of an aqueous buffer solution, of an alkalinity sufficient to impress and maintain thereon a pH value of 8.5 to 12.5 and to effect dissolution of the solid matter of the livers without saponifying the oil, and heating to a temperature below the boiling point of water, followed by separating the liberated oil and desiccating the same.

13. Method of treating fish livers, for the separation and recovery of oil therefrom, comprising the steps of subjecting the same to the action of an aqueous alkaline buffer solution, characterized by impressing and maintaining thereon a pH value from 10 to 11.5, to effect dissolution of the solid substance of the livers substantially without saponifying the oil content, and thereafter separating the liberated oil from the aqueous fraction.

14. Method of treating fish livers, for the separation and recovery of oil therefrom, comprising the steps of subjecting the same to the action of an ammonium hydroxide solution, characterized by impressing and maintaining thereon a pH value from 10 to 11.5, to effect dissolution of the solid substance of the livers, and thereafter separating the liberated oil from the aqueous fraction.

15. Method of treating fish livers, for the separation and recovery of oil therefrom, comprising the steps of subjecting the same to the action of an aqueous buffer solution, of an alkalinity sufficient to impress and maintain thereon a pH value of 10 to 11.5 to effect dissolution of the solid matter of the livers without saponifying the oil, and heating to a temperature below the boiling point of water, followed by separating the liberated oil.

HERBERT HEMPEL.